(12) United States Patent
Kitamura (10) Patent No.: US 11,610,735 B2
(45) Date of Patent: Mar. 21, 2023

(54) MANUFACTURING METHOD OF CERAMIC ELECTRONIC DEVICE AND METAL CONDUCTIVE PASTE

(71) Applicant: TAIYO YUDEN CO., LTD., Tokyo (JP)

(72) Inventor: Shohei Kitamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 109 days.

(21) Appl. No.: 17/177,048

(22) Filed: Feb. 16, 2021

(65) Prior Publication Data

US 2021/0280370 A1   Sep. 9, 2021

(30) Foreign Application Priority Data

Mar. 3, 2020   (JP) .............................. JP2020-035804

(51) Int. Cl.
    *H01G 4/12*    (2006.01)
    *H01G 4/30*    (2006.01)
    *H01G 4/008*   (2006.01)
    *C04B 35/468*  (2006.01)
    *H01G 4/012*  (2006.01)

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/658* (2013.01)

(58) Field of Classification Search
None
See application file for complete search history.

(56) References Cited

U.S. PATENT DOCUMENTS

| | | | |
|---|---|---|---|
| 7,595,974 B2 * | 9/2009 | Nakano | H01G 4/1227 361/321.4 |
| 2004/0188002 A1 * | 9/2004 | Kawamura | B82Y 30/00 428/209 |
| 2011/0141654 A1 * | 6/2011 | Okada | H01B 1/02 148/426 |
| 2013/0049532 A1 | 2/2013 | Kim et al. | |

(Continued)

FOREIGN PATENT DOCUMENTS

| | | | | |
|---|---|---|---|---|
| JP | 2010043345 A | * | 2/2010 | ............ B22F 1/0018 |
| JP | 2013055314 A | | 3/2013 | |
| JP | 2021061291 A | * | 4/2021 | |

*Primary Examiner* — Dion R. Ferguson
(74) *Attorney, Agent, or Firm* — Law Office of Katsuhiro Arai (57) ABSTRACT

A manufacturing method of a ceramic electronic device includes forming a multilayer structure by stacking a plurality of stack units, each of the stack units having a structure in which a pattern of metal conductive paste is provided on a dielectric green sheet including a dielectric material, the metal conductive paste including a metallic material of which a main component is Ni and a co-material of which a main component is barium titanate, the metal conductive paste of each of the stack units being alternately shifted, and firing the multilayer structure. FWHM of the metallic material)/(FWHM of the co-material) is 0.550 or less. The FWHM is of a (111) face evaluated by powder X-ray diffraction. An average particle diameter of the metallic material before the firing is 120 nm or less.

10 Claims, 8 Drawing Sheets

(56) References Cited

U.S. PATENT DOCUMENTS

| | | | |
|---|---|---|---|
| 2013/0100579 A1* | 4/2013 | Morito | B32B 18/00 |
| | | | 361/321.2 |
| 2017/0275174 A1* | 9/2017 | Uchiyama | H01G 4/085 |
| 2018/0336998 A1* | 11/2018 | Kitamura | H01G 4/30 |
| 2018/0336999 A1* | 11/2018 | Kitamura | H01G 4/30 |
| 2019/0267189 A1* | 8/2019 | Makino | H01G 4/1227 |
| 2021/0280370 A1* | 9/2021 | Kitamura | H01G 4/1227 |

* cited by examiner

MANUFACTURING METHOD OF CERAMIC ELECTRONIC DEVICE AND METAL CONDUCTIVE PASTE

CROSS-REFERENCE TO RELATED APPLICATION

This application is based upon and claims the benefit of priority of the prior Japanese Patent Application No. 2020-035804, filed on Mar. 3, 2020, the entire contents of which are incorporated herein by reference.

FIELD

A certain aspect of the present invention relates to a manufacturing method of a ceramic electronic device and metal conductive paste.

BACKGROUND

Downsizing and enlarging of capacity are requested, with respect to ceramics electronic devices such as multilayer ceramic capacitors. And so, improvement of an effective capacity is requested by reducing thicknesses of dielectric layers and internal electrode layers. However, when the thickness of the internal electrode layers is reduced, a continuity modulus of the internal electrode layers after sintering may be remarkably degraded because of a difference of a sintering temperature of the dielectric layers and a sintering temperature of the internal electrode layers. And so, a co-material is added to the internal electrode layers in order to delay contraction (for example, see Japanese Patent Application Publication No. 2013-055314).

SUMMARY OF THE INVENTION

However, when the thickness of the internal electrode layers is reduced, spheroidizing of the internal electrode layers at a starting temperature of sintering is remarkable in the sintering process even if the co-material is used. Therefore, the continuity modulus may be small after the sintering. And desirable capacity may not be necessarily achieved.

The present invention has a purpose of providing a manufacturing method of a ceramic electronic device and metal conductive paste that are capable of suppressing reduction of the continuity modulus of internal electrode layers.

According to an aspect of the present invention, there is provided a manufacturing method of a ceramic electronic device including: forming a multilayer structure by stacking a plurality of stack units, each of the stack units having a structure in which a pattern of metal conductive paste is provided on a dielectric green sheet including a dielectric material, the metal conductive paste including a metallic material of which a main component is Ni and a co-material of which a main component is barium titanate, the metal conductive paste of each of the stack units being alternately shifted; and firing the multilayer structure, wherein (FWHM of the metallic material)/(FWHM of the co-material) is 0.550 or less, wherein the FWHM is of a (111) face evaluated by powder X-ray diffraction, and wherein an average particle diameter of the metallic material before the firing is 120 nm or less.

According to another aspect of the present invention, there is provided metal conductive paste including: a metallic material of which a main component is Ni; and a co-material of which a main component is barium titanate, wherein (FWHM of the metallic material)/(FWHM of the co-material) is 0.550 or less, wherein the FWHM is of a (111) face evaluated by powder X-ray diffraction, and wherein an average particle diameter of the metallic material is 120 nm or less.

DETAILED DESCRIPTION

A description will be given of an embodiment with reference to the accompanying drawings.

Embodiment

Figure 1:
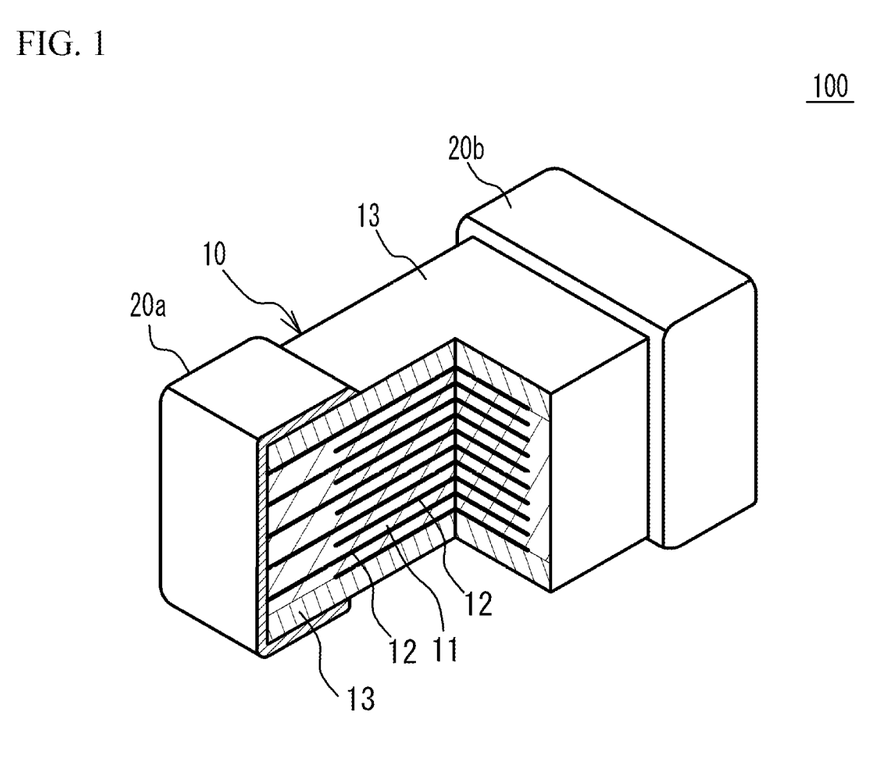
FIG. 1 illustrates a partial perspective view of a multilayer ceramic capacitor.

FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 opposite to each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is nickel (Ni). An average thickness of the internal electrode layers 12 is, for example, 0.8 μm or less. It is preferable that the average thickness of the internal electrode layers 12 is 0.6 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
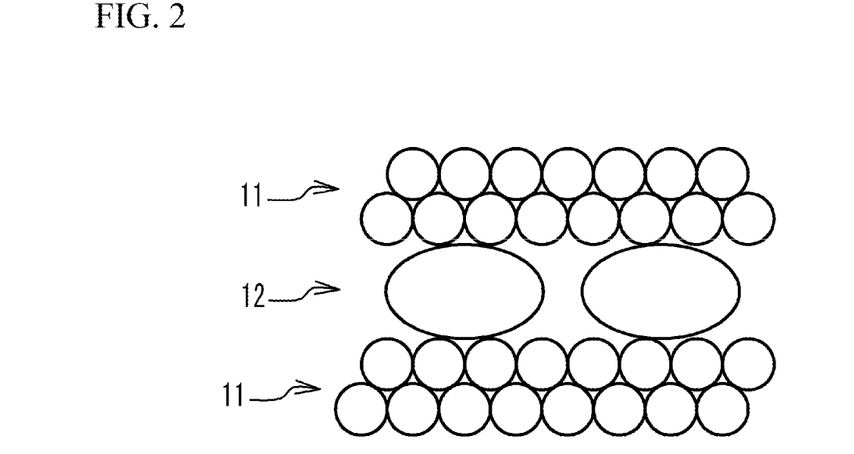
FIG. 2 illustrates a spheroidization of an internal electrode layer.

]In a case where the internal electrode layer 12 is formed by sintering metal powder, when the sintering progresses, the metal powder tends to be spheroidized in order to minimize surface energy. The metal component of the internal electrode layers 12 is sintered earlier than the main component ceramic of the dielectric layers 11. Therefore, when the temperature is increased to a value at which the main component ceramic of the dielectric layers 11 is sintered, the metal component of the internal electrode layers 12 is excessively sintered and tends to be spheroidized. In this case, when there is a reason (defect) of break, the internal electrode layers 12 is broken from the defect and the continuity modulus decreases as illustrated in FIG. 2. When the continuity modulus of the internal electrode layers 12 decreases, the capacity of the multilayer ceramic capacitor 100 may be reduced.

When the thickness of the internal electrode layers 12 is reduced, re-extension of the dielectric layers 11 caused by sintering contraction may hardly occur. Therefore, the continuity modulus may be easily reduced in the multilayer ceramic capacitor 100 in which the average thickness of the internal electrode layers 12 is 0.6 μm or less.

Figure 3:
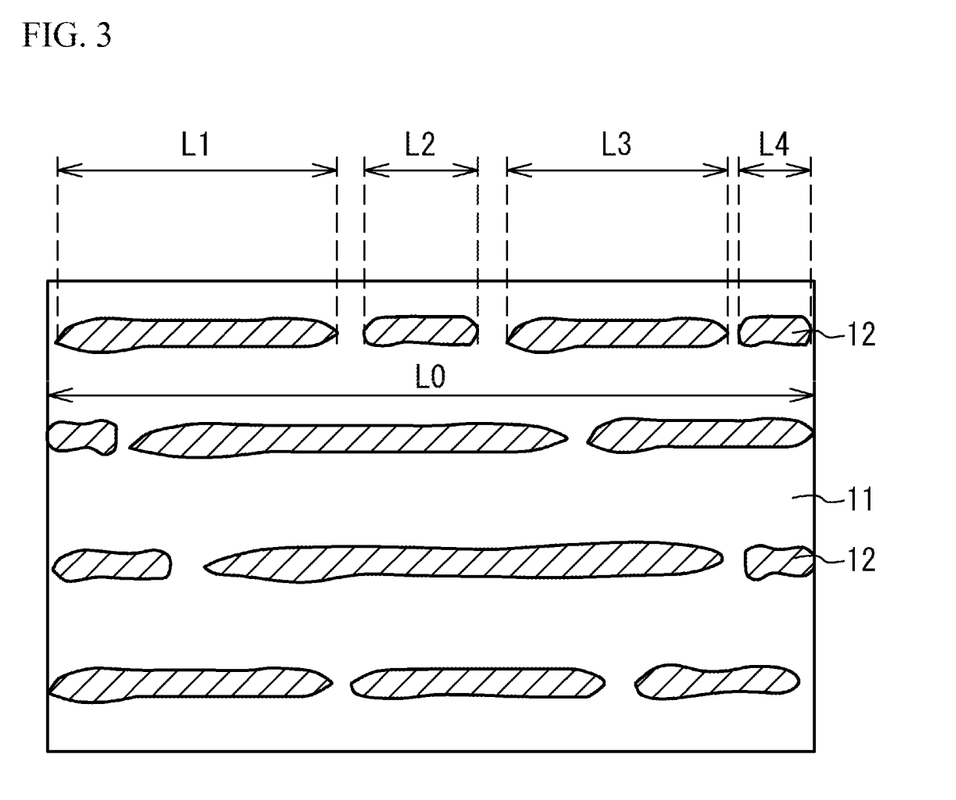
FIG. 3 illustrates a continuity modulus.

FIG. 3 illustrates the continuity modulus. As illustrated in FIG. 3, in an observation area having a length L0 in the internal electrode layer 12, lengths L1, L2 to Ln of metal portions are measured and summed. A ratio of the metal portions $\Sigma Ln/Lo$ can be defined as the continuity modulus.

Figure 4:
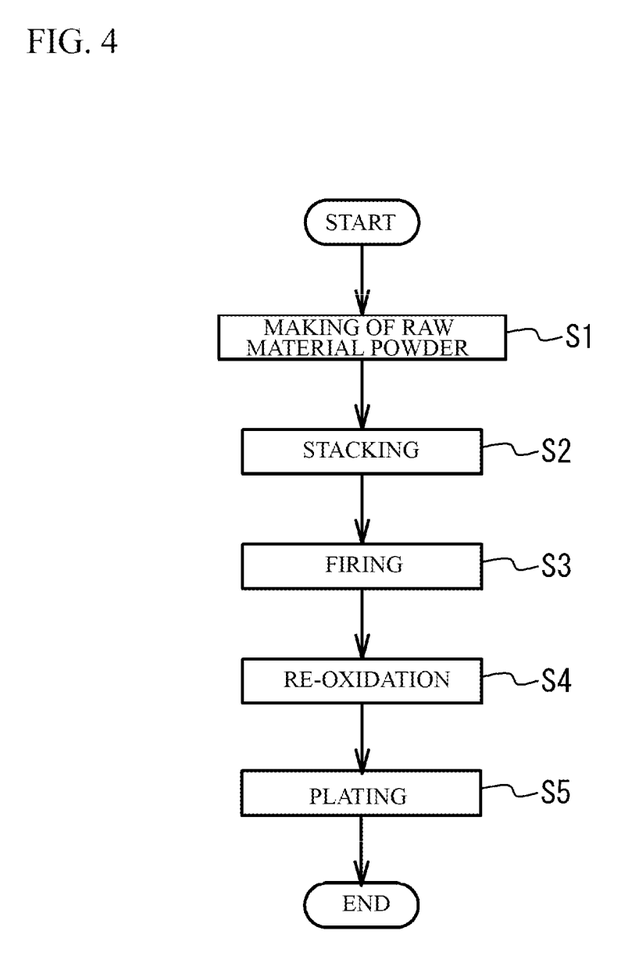
FIG. 4 illustrates a manufacturing method of a multilayer ceramic capacitor.

In the embodiment, a description will be given of a manufacturing method of the multilayer ceramic capacitor 100 and metal conductive paste that are capable of suppressing reduction of the continuity modulus of the internal electrode layers 12. FIG. 4 illustrates a manufacturing method of the multilayer ceramic capacitor 100.

(Making process of a raw material powder) (S1) An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mo (molybdenum), Nb (niobium), Ta (tantalum), W (tungsten), Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium), Yb (ytterbium), or an oxide of Co (cobalt), Ni (nickel), Li (lithium), B (boron), Na (sodium), K (potassium) and Si (silicon), or glass.

For example, it is preferable that an average particle diameter of the ceramic powder is 50 nm to 200 nm from a viewpoint of reducing the thickness of the dielectric layers 11. For example, the particle diameter of the resulting ceramic may be adjusted by crushing the resulting ceramic powder. Alternatively, the grain diameter may be adjusted by performing the crushing and a classifying process. With the processes, the dielectric material is obtained.

Figure 5A:
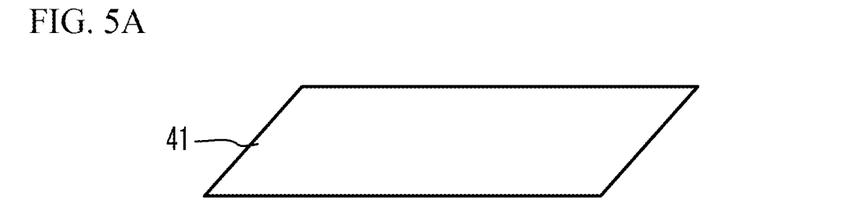
FIG. 5A to FIG. 5C illustrate a stacking process.

(Stacking Process) (S2) Next, a binder such as polyvinyl butyral (PVB) resin, an organic solvent such as ethanol or toluene, and a plasticizer are added to the resulting dielectric material and wet-blended. As illustrated in FIG. 5A, with use of the resulting slurry, a strip-shaped dielectric green sheet 41 with a thickness of 0.8 μm or less is painted on a base material by, for example, a die coater method or a doctor blade method, and then dried. In FIG. 5A, the base material is not illustrated.

Figure 5B:
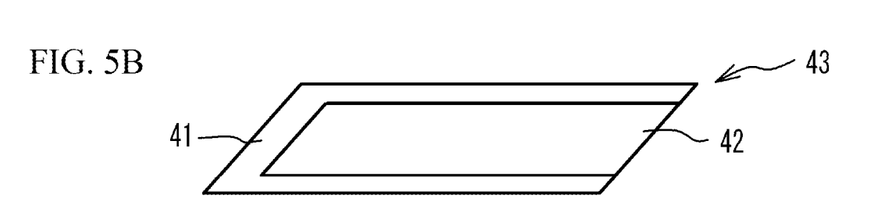
Figure 5C:
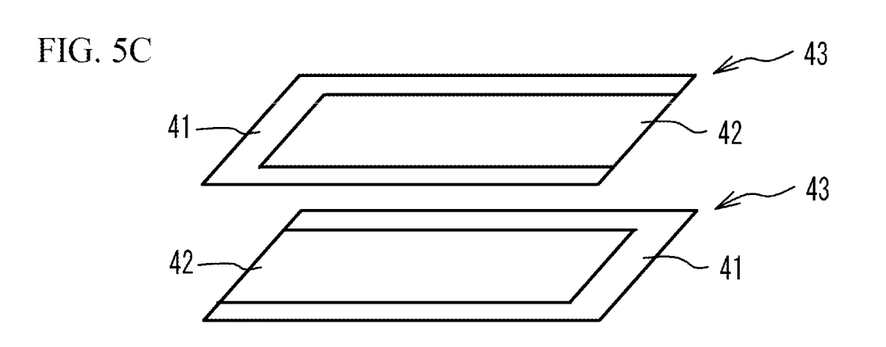

Next, as illustrated in FIG. 5B, metal conductive paste 42 for the internal electrode layer is formed on the surface of the dielectric green sheet 41 with use of screen printing or gravure printing. The metal conductive paste 42 contains an organic binder. Thus, a sheet member 43 is obtained. The sheet member 43 is a stack unit.

Thereafter, a predetermined number of the sheet members 43 are stacked while the base material is peeled so that the end edges of the metal conductive paste 42 are alternately exposed to both edge faces in the length direction of the dielectric green sheet 41. For example, 100 to 500 stack units are stacked. Thereafter, cover sheets, which are to be the cover layers 13, are compressed on and under the multilayer structure of the stacked sheet members 43 to obtain a ceramic multilayer structure. After that, both end faces of the ceramic multilayer structure are coated with metal conductive paste to be the external electrodes 20a and 20b by a dipping method. After that, the metal conductive paste is dried. Thus, a compact for forming the multilayer ceramic capacitor 100 is obtained.

The metal conductive paste 42 corresponding to the internal electrode layers 12 may be printed on a plurality of regions of a single dielectric green sheet 41. In this case, the stacked sheet members 43 are stacked. Cover sheets are clamped. After that, the stacked sheet members 43 was cut into chips having a predetermined size (for example, 1.0 mm×0.5 mm). Metal conductive paste acting as base layers of the external electrodes 20a and 20b is applied to both end faces of the chips by a dipping method or the like and is dried.

A description will be given of details of the metal conductive paste 42. The metal conductive paste 42 includes a metallic material and a co-material. In order to reduce the thickness of the internal electrode layers 12, the metallic material having a small particle diameter is used. In the embodiment, the metallic material is Ni powder having an average particle diameter of 120 nm or less. A standard deviation of the particle diameter is approximately 35. In this case, sharp particle size distribution is obtained. It is preferable that the average particle diameter is 100 nm or less. It is more preferable that the average particle diameter is 80 nm or less. It is preferable that the standard deviation of the particle diameter is 15 or less. It is more preferable that the standard deviation of the particle diameter is 13 or less. An inclination of accumulated particle size distribution is 8 or more. The inclination of the accumulated particle size distribution can be defined as an inclination (=1/(log D80–log D20)) between D20 and D80 in a case where the accumulated particle size distribution is plotted in a logarithmic manner. In the embodiment, barium titanate is used as the co-material.

Figure 6A:
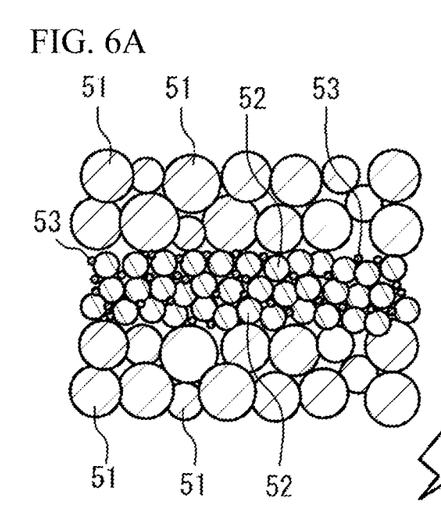
FIG. 6A to FIG. 6E illustrate firing of metal conductive paste.

FIG. 6A illustrates a stacked structure in which a pattern of a metallic material 52 is stacked on a sheet of a dielectric material 51, and another sheet of the dielectric material 51 is stacked on the pattern. The sheets of the dielectric material 51 correspond to the dielectric green sheets 41 of FIG. 5B. The pattern of the metallic material 52 corresponds to the metal conductive paste 42 of FIG. 5B. As illustrated in FIG. 6A, a co-material 53 is dispersed in the pattern of the metallic material 52.

Figure 6B:
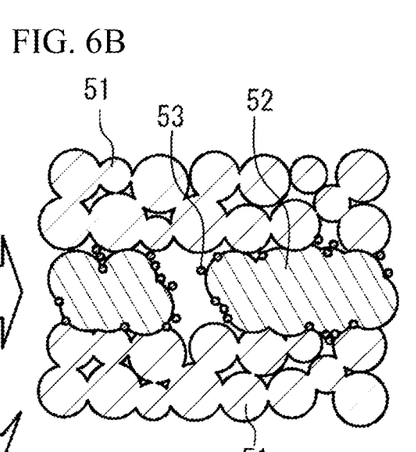
Figure 6C:
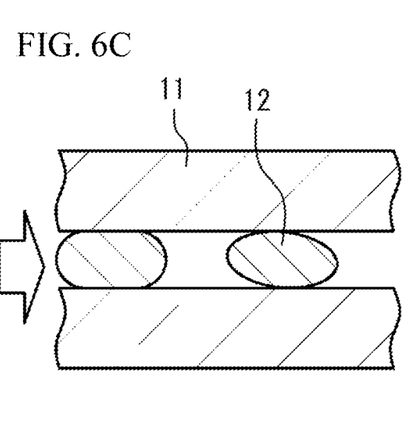

As illustrated in FIG. 6B, the metallic materials 52 starts necking with each other, when the co-material 53 is extruded from the metallic materials 52 during the firing process and the co-material 53 does not exist in the metallic materials 52. In this case, as illustrated in FIG. 6C, spheroidization of the metallic material 52 is further promoted because the metallic material 52 does not exist in the metallic materials 52, when a temperature of the dielectric material 51 reaches a temperature range in which the dielectric material 51 is densified by sintering.

Figure 6D:
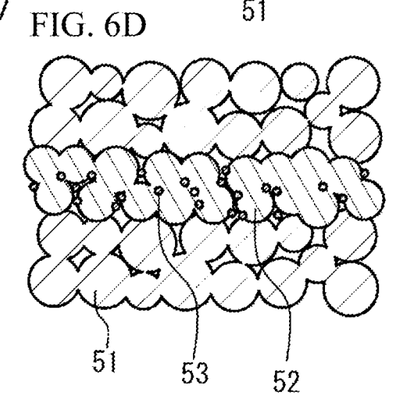
Figure 6E:
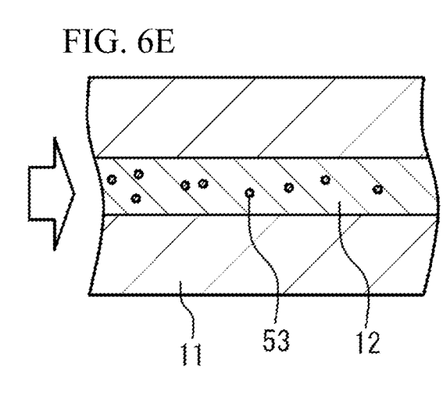

As illustrated in FIG. 6D, the co-material 53 exists in the metallic materials 52, when the co-material 53 is not extruded from the metallic materials 52 during the firing process. In this case, the necking of the metallic materials 52 is prevented. And the spheroidization of the metallic material 52 is suppressed. In this case, as illustrated in FIG. 6E, the firing is completed when the temperature of the dielectric material 51 reaches the temperature range in which the dielectric material 51 is densified by sintering, while the continuity modulus of the internal electrode layers 12 is maintained.

And so, in the manufacturing method of the embodiment, the co-material 53 is easily dispersed in the metallic materials 52. When the co-material 53 is highly dispersed in the metallic materials 52, the co-material exists in the metallic materials 52.

Figure 7:
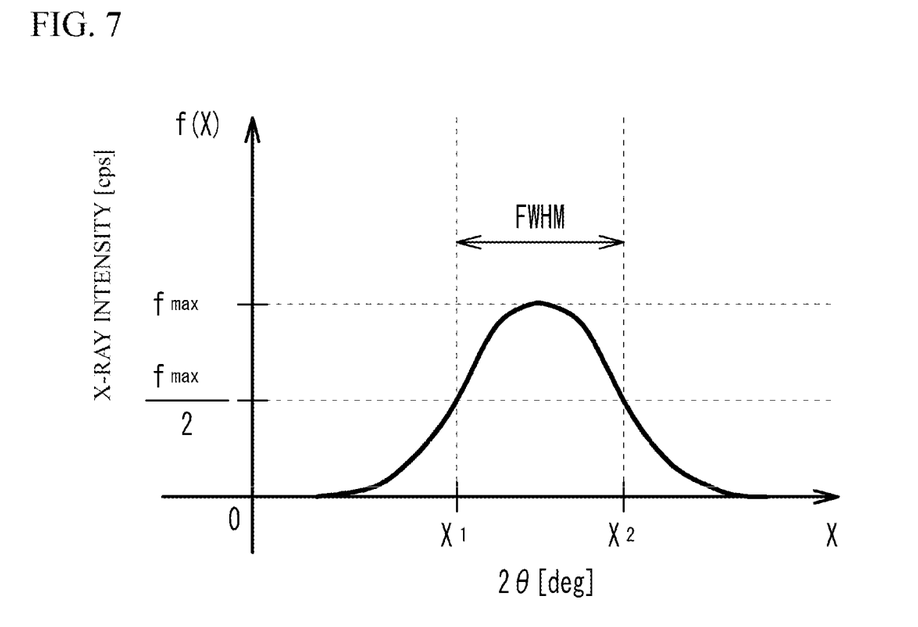
FIG. 7 illustrates FWHM.

In concrete, as described above, the Ni powder having the average particle diameter of 120 nm or less is used as the metallic material 52. Thus, the co-material 53 is easily dispersed in the metallic materials 52. Next, the crystallinity of the co-material 53 is sufficiently lower than that of the metallic material 52 of the metal conductive paste. Thus, the metallic material 52 is easily dispersed in the metallic materials 52. The embodiment focuses on a half width (FWHM: Full Width at Half Maximum) of (111) face of a case where the co-material 53 is evaluated by powder X-ray diffraction and (111) face of a case where the metallic material 52 is evaluated by powder X-ray diffraction. In the embodiment, (FWHM of the metallic material 52)/(FWHM of the co-material 53) is 0.550 or less. In this case, the crystallinity of the co-material 53 is sufficiently lower than that of the metallic material 52. From a viewpoint of lowering the crystallinity of the co-material 53, it is preferable that (FWHM of the metallic material 52)/(FWHM of the co-material 53) is 0.520 or less. From a viewpoint of sufficiently raising the crystallinity of the metallic material 52 with respect to that of the co-material 53, it is preferable that (FWHM of the metallic material 52)/(FWHM of the co-material 53) is 0.140 or more. It is more preferable that (FWHM of the metallic material 52)/(FWHM of the co-material 53) is 0.130 or more. As illustrated in FIG. 7, FWHM is a peak width at $f_{max}/2$ which is a half value of the peak value ($f_{max}$).

From a viewpoint of dispersion of the co-material 53, it is preferable that the co-material has a small particle diameter. It is preferable an average particle diameter of the co-material 53 is 10 nm or less. It is preferable that a standard deviation of the particle diameter is 5 or less. In this case, sharp particle size distribution is obtained. It is preferable that the average particle diameter is 15 nm or less. It is more preferable that the average particle diameter is 10 nm or less. It is preferable that the standard deviation of the particle diameter is 5 or less. It is more preferable that the standard deviation of the particle diameter is 3 or less. An inclination of accumulated particle size distribution is 7 or more. The inclination of the accumulated particle size distribution can be defined as an inclination (=1/(log D80–log D20)) between D20 and D80 in a case where the accumulated particle size distribution is plotted in a logarithmic manner.

From a viewpoint of sufficiently lowering crystallinity of the co-material 53, it is preferable that the FWHM of the co-material 53 is 1.1 or more. It is more preferable that the FWHM is 1.3 or more. It is still more preferable that the FWHM is 1.6 or more.

From a viewpoint of easily dispersing the co-material 53, it is preferable that the crystallinity of the co-material 53 is high. It is preferable that the FWHM of the metallic material 52 is 0.7 or less. It is more preferable that the FHWM is 0.6 or less.

It is possible to adjust the FWHM by arbitrarily adjusting the particle diameter of the metallic material 52. It is possible to arbitrarily adjust the FWHM of the co-material 53 by adjusting the particle diameter of the co-material or selecting synthesizing method of the ceramic powder (a solid-phase method, a hydrothermal method, an oxalic acid method, a sol-gel method or the like).

(Firing process) (S3) Next, after removing the binder in $N_2$ atmosphere at 250 degrees C. to 500 degrees C., the resulting compact is fired for ten minutes to 2 hours in a reductive atmosphere, of which an oxygen partial pressure is $10^{-5}$ to $10^{-8}$ atm, in a temperature range of 1100 degrees C. to 1300 degrees C. In this manner, the multilayer ceramic capacitor 100 is obtained. When a speed of temperature increasing in the firing process is enlarged, the metallic material 52 is sintered before the co-material 53 is extruded from the metallic material 52. Therefore, the co-material 53 tends to exist in the internal electrode layer 12. For example, it is preferable that the average speed of the temperature increasing from a room temperature to a maximum temperature in the firing process is 30 degrees C./minute or more. It is more preferable that the average speed of the temperature increasing is 45 degrees C./minute or more. When the average speed of the temperature increasing is excessive large, an organic component existing in the compact (which is left after the process for removing the binder) is not sufficiently removed. And a defect such as crack may occur in the firing process. And so, it is preferable that the average speed of the temperature increasing is 80 degrees C./minute or less. It is more preferable that the average speed of the temperature increasing is 65 degrees C./minute or less.

(Re-oxidizing process) (S4) After that, a re-oxidizing process may be performed at 600 degrees C. to 1000 degrees C. in $N_2$ gas atmosphere.

(Plating process) (S5) After that, metal layers such as Cu, Ni or Su are applied to the ground layers of the external electrodes 20a and 20b by a plating process.

In the manufacturing method of the embodiment, the average particle diameter of the metallic material 52 is 120 nm or less. The co-material 53 having the relationship of (FWHM of the metallic material 52)/(FWHM of the co-material 53) is mixed with the metallic material 52 for forming the internal electrode layers 12. In this manner, the co-material is easily dispersed in the metallic materials 52. When the co-material 53 is highly-dispersed in the metallic materials 52, the co-material 53 exists in the metallic materials 52. This results in preventing the necking between the metallic materials 52. The spheroidization of the metallic material 52 is suppressed. And reduction of the continuity of the internal electrode layers 12 is suppressed.

In the above embodiment, the multilayer ceramic capacitor has been described as an example of the ceramic electronic component. However, the ceramic electronic component is not limited to the multilayer ceramic capacitor. For example, the ceramic electronic component may be other electronic components such as a varistor and a thermistor.

EXAMPLES

The multilayer ceramic capacitor in accordance with the embodiment was fabricated, and the characteristics thereof were examined.

(Examples 1 to 3 and Comparative examples 1 to 4) Barium titanate powder was prepared as the dielectric material 51. A necessary additive compound was added to the barium titanate powder. The resulting barium titanate powder was sufficiently wet-blended and crushed with a ball mil. Thus, the dielectric material 51 was obtained. An organic binder and a solvent were added to the dielectric material 51. And the dielectric green sheets 41 were made by a doctor blade method. A thickness of the dielectric green sheet was 0.8 μm. The organic binder was polyvinyl butyral (PVB) resin or the like. The solvent was ethanol, toluene or the like. And a plasticizer and so on were added.

Next, the metal conductive paste 42 for forming the internal electrode layer was formed by a planetary boll mill. The metal conductive paste 42 included a main component metal (Ni) powder of the internal electrode layer 12 (50 wt % of Ni solid content), 10 weight part of a co-material (barium titanate), 5 weight part of binder (ethyl cellulose), a solvent and an auxiliary as needed. In the example 1 and the comparative example 1, Ni powder of which an average particle diameter was 80 nm was used as the metallic material 52. In the example 2 and the comparative example 2, Ni powder of which an average particle diameter was 100 nm was used as the metallic material 52. In the example 3 and the comparative example 3, Ni powder of which an average particle diameter was 120 nm was used as the metallic material 52. In the comparative example 4, Ni powder of which an average particle diameter was 140 nm was used as the metallic material 52. In the comparative example 5, Ni powder of which an average particle diameter was 160 nm was used as the metallic material 52.

In the examples 1 to 3 and the comparative example 5, barium titanate of which an average particle diameter was 8 nm was used as the co-material 53. In the comparative examples 1 to 4, barium titanate of which the average particle diameter was 50 nm was used as the co-material 53. The (111) face of the metallic materials 52 of the example 1 and the comparative example 1 was 0.666. The (111) face of the metallic materials 52 of the example 2 and the comparative example 2 was 0.561. The (111) face of the metallic materials 52 of the example 3 and the comparative example 3 was 0.182. The (111) face of the metallic material 52 of the comparative example 4 was 0.170. The (111) face of the metallic material 52 of the comparative example 5 was 0.163. In the examples 1 to 3 and the comparative example 5, the (111) face of the co-material 53 was 1.300. In the comparative examples 1 to 4, the (111) face of the co-material 53 was 0.300. In the example 1, (FWHM of the metallic material 52)/(FWHM of the co-material 53) was 0.512. In the example 2, (FWHM of the metallic material 52)/(FWHM of the co-material 53) was 0.432. In the example 3, (FWHM of the metallic material 52)/(FWHM of the co-material 53) was 0.140. In the comparative example 1, (FWHM of the metallic material 52)/(FWHM of the co-material 53) was 2.220. In the comparative example 2, (FWHM of the metallic material 52)/(FWHM of the co-material 53) was 1.870. In the comparative example 3, (FWHM of the metallic material 52)/(FWHM of the co-material 53) was 0.607. In the comparative example 4, (FWHM of the metallic material 52)/(FWHM of the co-material 53) was 0.567. In the comparative example 5, (FWHM of the metallic material 52)/(FWHM of the co-material 53) was 0.125. Table 1 shows the results.

The metal conductive paste 42 for forming the internal electrode layer was screen-printed on the dielectric green sheet 41. 250 numbers of sheet members 43 in which the metal conductive paste 42 was printed on the dielectric green sheet 41 were stacked, and cover sheets were stacked on the stacked sheet members 43 and under the stacked sheet members 43. After that, a ceramic multilayer structure was obtained by a thermal compressing. And the ceramic multilayer structure was cut into a predetermined size.

The binder was removed from the ceramic multilayer structure in $N_2$ atmosphere. After that, the metal conductive paste including the metal filler of which a main component was Ni, the co-material, the binder and the solvent was painted from the both end faces to the side faces of the ceramic multilayer structure and was dried. After that, the resulting multilayer structure was fired together with the metal conductive paste for 10 minutes to 2 hours in a reductive atmosphere in a temperature range of 1100 degrees C. to 1300 degrees C. And, a sintered structure was formed. The average speed of temperature increasing from a room temperature to a maximum temperature was 30 degrees C./minute or more and 80 degrees C./minute or less.

The resulting sintered structure had a length of 0.6 mm, a width of 0.3 mm and a height of 0.3 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of a base layer. And, the multilayer ceramic capacitor 100 was obtained. The average thickness of the internal electrode layers 12 was 0.5 μm in the examples 1 to 5.

Figure 8A:
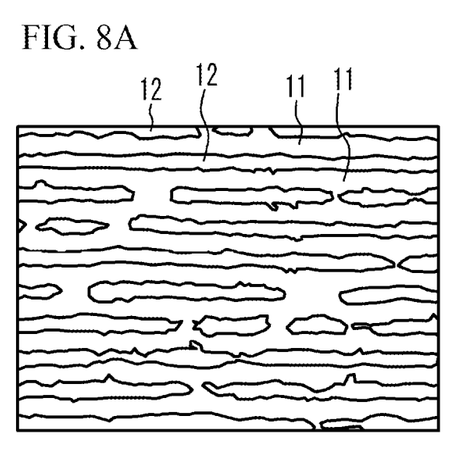
FIG. 8A to FIG. 8D schematically illustrate a SEM image.
Figure 8B:
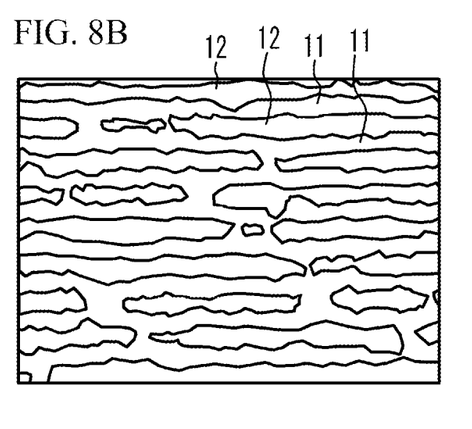
Figure 8C:
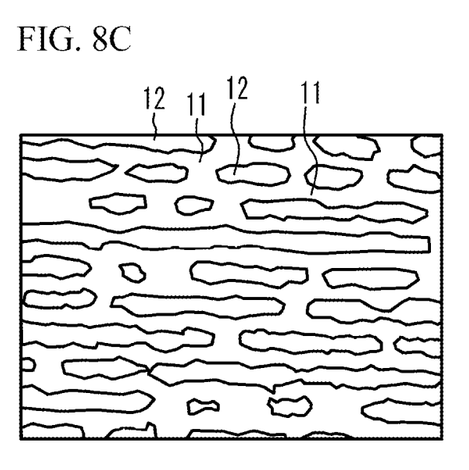
Figure 8D:
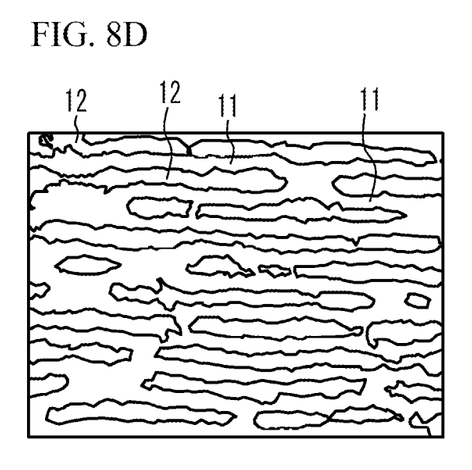

(Analysis) With respect to the examples 1 to 3 and the comparative examples 1 to 4, the continuity modulus of the internal electrode layer 12 was measured. A SEM (Scanning type Electron Microscope) image in a cross section in a stacking direction of the dielectric layer 11 and the internal electrode layer 12 at a center portion of a sample in a width direction was used. In concrete, the continuity modulus of all internal electrode layers in several SEM images were measured. An average value was used as the continuity modulus. When the continuity modulus was 80% or more, the sample was determined as good "○". When the continuity modulus was less than 80%, the sample was determined as bad "X". FIG. 8A schematically illustrates a SEM image of the example 1. FIG. 8B schematically illustrates a SEM image of the example 3. FIG. 8C schematically illustrates a SEM image of the comparative example 4. FIG. 8D schematically illustrates a SEM image of the comparative example 5. The number of break of the internal electrode layers 12 of FIG. 8A and FIG. 8B is smaller than the number of break of the internal electrode layers 12 of FIG. 8C and FIG. 8D.

As shown in Table 1, the continuity modulus was determined as good in the examples 1 to 3. It is thought that this was because the average particle diameter of the metallic material 52 was 120 nm or less, and the relationship of (FWHM of the metallic material 52)/(FWHM of the co-material 53)≤0.550 was satisfied. On the other hand, the continuity modulus was determined as bad in the comparative examples 1 to 5. It is thought that this was because (FWHM of the metallic material 52)/(FWHM of the co-material 53) was larger than 0.520. It is thought that this was because the average particle diameter of the metallic material 52 was larger than 120 nm.

Although the embodiments of the present invention have been described in detail, it is to be understood that the various change, substitutions, and alterations could be made hereto without departing from the spirit and scope of the invention.

What is claimed is:

1. A manufacturing method of a ceramic electronic device comprising:
    forming a multilayer structure by stacking a plurality of stack units, each of the stack units having a structure in which a pattern of metal conductive paste is provided on a dielectric green sheet including a dielectric material, the metal conductive paste including a metallic material of which a main component is Ni and a co-material of which a main component is barium titanate, the metal conductive paste of each of the stack units being alternately shifted; and
    firing the multilayer structure,
    wherein (FWHM of the metallic material)/(FWHM of the co-material) is 0.550 or less,
    wherein the FWHM is of a (111) face evaluated by powder X-ray diffraction, and
    wherein an average particle diameter of the metallic material before the firing is 120 nm or less.

2. The method as claimed in claim 1, wherein an average particle diameter of the co-material is 10 nm or less.

3. The method as claimed in claim 1, wherein an average thickness of internal electrode layers formed by firing the metal conductive paste is 0.8 μm or less.

4. The method as claimed in claim 1, wherein the FWHM of the co-material before the firing is 1.1 or more.

5. The method as claimed in claim 1, wherein the FWHM of the metallic material before the firing is 0.7 or less.

6. The method as claimed in claim 1, wherein a main component of the dielectric material is barium titanate.

7. Metal conductive paste comprising:
    a metallic material of which a main component is Ni; and
    a co-material of which a main component is barium titanate,
    wherein (FWHM of the metallic material)/(FWHM of the co-material) is 0.550 or less,
    wherein the FWHM is of a (111) face evaluated by powder X-ray diffraction, and
    wherein an average particle diameter of the metallic material is 120 nm or less.

8. The metal conductive paste as claimed in claim 7, wherein an average particle diameter of the co-material is 10 nm or less.

9. The metal conductive paste as claimed in claim 7, wherein the FWHM of the co-material is 1.1 or more.

10. The metal conductive paste as claimed in claim 7, wherein the FWHM of the metallic material is 0.7 or less.

* * * * *